United States Patent
Steinert et al.

(10) Patent No.: US 8,013,288 B2
(45) Date of Patent: Sep. 6, 2011

(54) METHOD FOR CORRECTING A CONTROL OF AN OPTICAL SCANNER AND THE OPTICAL SCANNER

(75) Inventors: Joerg Steinert, Jena (DE); Joerg Engel, Weida (DE)

(73) Assignee: Carl Zeiss MicroImaging GmbH, Jena (DE)

( * ) Notice: Subject to any disclaimer, the term of this patent is extended or adjusted under 35 U.S.C. 154(b) by 0 days.

(21) Appl. No.: 12/823,242

(22) Filed: Jun. 25, 2010

(65) Prior Publication Data

US 2010/0321752 A1   Dec. 23, 2010

Related U.S. Application Data

(63) Continuation of application No. 11/525,209, filed on Sep. 22, 2006, now abandoned.

(30) Foreign Application Priority Data

Oct. 1, 2005   (DE) .......................... 10 2005 047 218

(51) Int. Cl.
*H01J 3/14*   (2006.01)
(52) U.S. Cl. ..................................... 250/234; 359/197.1
(58) Field of Classification Search .......... 250/234–236, 250/201.3; 359/197.1, 199.1, 212.1, 213.1, 359/368
See application file for complete search history.

(56) References Cited

U.S. PATENT DOCUMENTS

| | | | |
|---|---|---|---|
| 5,478,997 A | 12/1995 | Bridgelall et al. | |
| 5,504,316 A | 4/1996 | Bridgelall et al. | |
| 6,037,583 A | 3/2000 | Moehler et al. | |
| 6,040,567 A | 3/2000 | Neher et al. | |
| 6,107,770 A | 8/2000 | Jackson et al. | |
| 6,674,045 B2 | 1/2004 | Iwase et al. | |
| 6,677,579 B2 | 1/2004 | Engelhardt | |
| 6,914,238 B2 | 7/2005 | Engelhardt et al. | |
| 7,023,598 B2 * | 4/2006 | Toyama et al. | 359/212.2 |
| 2002/0024007 A1 | 2/2002 | Engelhardt et al. | |
| 2003/0010888 A1 | 1/2003 | Shimada et al. | |
| 2004/0036938 A1 | 2/2004 | Wohlfrom | |
| 2004/0212862 A1 | 10/2004 | Toyama et al. | |
| 2005/0128553 A1 | 6/2005 | Toyama et al. | |
| 2005/0184156 A1 | 8/2005 | Otsuki et al. | |

FOREIGN PATENT DOCUMENTS

| | | |
|---|---|---|
| DE | 3125449 A1 | 2/1983 |
| DE | 197 10 714 C1 | 9/1998 |
| DE | 197 02 752 A1 | 3/2000 |

(Continued)

*Primary Examiner* — Kevin Pyo
(74) *Attorney, Agent, or Firm* — Jacobson Holman PLLC (57) ABSTRACT

In a method for correcting a control of an optical scanner (14) which has a beam deflecting element (31) for deflecting a beam of optical radiation and a drive unit (30, 30') for moving the beam deflecting element (31), said drive unit deflecting a beam of optical radiation directed at the beam deflecting element (31) according to a predetermined target movement using at least one parameter and/or a transfer function, preferably optical, said parameter or transfer function being used to control or regulate the system. In a determination step at least one current value of a drive unit transfer function that reproduces the response of the drive unit (30, 30') to a predetermined target movement or a change in a target movement is ascertained for at least one frequency, and in a correction step at least one parameter and/or the transfer function is corrected as a function of the current value of the drive unit transfer function.

19 Claims, 5 Drawing Sheets

FOREIGN PATENT DOCUMENTS

| DE | 100 38 622 A1 | 2/2002 |
| DE | 10126286 A | 12/2002 |
| DE | 102 37 384 A1 | 3/2004 |
| DE | 10 2004 042031 A1 | 9/2005 |
| EP | 1238745 A2 | 9/2002 |

* cited by examiner

METHOD FOR CORRECTING A CONTROL OF AN OPTICAL SCANNER AND THE OPTICAL SCANNER

CROSS-REFERENCE TO RELATED APPLICATIONS

The present patent application is a continuation of application Ser. No. 11/525,209, filed Sep. 22, 2006, which claims priority from German Application No. 10 2005 047 218.4, filed Oct. 1, 2005, both of which are incorporated herein by reference in their entireties.

BACKGROUND OF THE INVENTION

1. Field of the Invention

The present invention relates to a method for correcting a control of an optical scanner and an optical scanner.

2. Description of Related Art Including Information Disclosed Under 37 CFR §§1.97 and 37 CFR 1.98

Optical scanners, which are understood below to include in particular deflecting devices for controlled deflection of a beam of optical radiation that can be controlled in particular by preselecting a target movement or can be controlled by control signals, are used in various areas of technology. Laser scanning microscopes constitute an important area for use of such optical scanners. With laser scanning microscopes, a sample is scanned with a laser beam focused as a rule in a spot on a layer of the sample, whereby the focus is confocally mapped on a detection device. To deflect the laser beam to a predetermined position on the sample and to deflect the detection radiation emanating from the focus to the detection device, a deflection device, i.e., an optical scanner is used, permitting controlled deflection of the laser beam, i.e., the detection radiation. For detection of an image of a layer of the sample, the laser beam and/or its focus is guided line by line over the sample from a first end position to a second end position and then back, with the beam being deflected in each of the end positions in a direction orthogonal to the direction of movement in the line, so that the focus jumps to the next line. The focus is moved in the most linear and uniform possible movement in the line, so that by detection of the detection radiation in constant time intervals, a pixel representation of an image in which the pixels, which are also arranged in a matrix, are assigned to the locations, is obtained, in which the pixels are then also arranged in the form of a matrix so they are equidistant. Therefore, an undistorted image is obtained only when the movement of the focus corresponds precisely to a uniform linear movement. The requirements of accurate control of an optical scanner used in a laser scanning microscope are very high.

To obtain a high accuracy, as described in DE 197 02 752 C2 (U.S. Pat. No. 6,037,583), for example, by means of a position sensor, the position of the drive and/or the mirror of the scanner may be detected in the form of a feed-back signal and/or a position signal on the basis of which deviations from a target position are corrected. However, this procedure is not accurate enough for high scanning speeds. Electronic processing of feedback signals and detection signals leads to distortion of the signals and to phase differences between the signals. In addition, owing to deformation of the scanner wave by means of which the drive movement is transmitted to the mirror, and deformations in the scanner mirror itself, the reported position does not correspond to the actual position of the mirror. The actual position of the deflected beam thus does not correspond to the desired target position.

It is therefore possible to perform an optical calibration of the scanner in which the control of the scanner is adjusted so that the actual movement of the focus corresponds to the target movement as accurately as possible.

However, even when there is very good optical calibration, errors in the image, e.g., a "fraying" of vertical lines or distortion of the image geometry may occur after an extended period of time with a bidirectional scan due to wear on the scanner, in particular a drive unit of the scanner, because the scanner does not respond to control in the same way as in optical calibration. However, optical calibration is too complicated and expensive to be able to perform it frequently.

BRIEF SUMMARY OF THE INVENTION

Therefore, the object of the present invention is to provide a method for correcting a control of an optical scanner that is simple and quick to perform and to provide an optical scanner whose control can be corrected easily and quickly.

This object is achieved by a method for correcting a control of an optical scanner having a beam deflecting element for deflecting a beam of optical radiation and a drive unit for moving the beam deflecting element, which moves the beam deflecting element out of a predetermined target movement according to control signals which are generated using at least one parameter that is used for control or regulation and/or using a transfer function, preferably optical, wherein, in a determination step, at least one current value of a drive unit transfer function is determined, said drive unit transfer function reproducing the response of the drive unit to control signals that are determined for at least one frequency from a preselected target movement or a change in a target movement, and in a correction step at least one parameter and/or the transfer function is corrected as a function of the current value of the drive unit transfer function.

This object is also achieved by an optical scanner with a beam deflecting element for deflecting a beam of optical radiation, a drive unit for movement of the beam deflecting element, which moves the beam deflecting element according to control signals, and a scan control unit connected to the drive unit for transmitting control signals for controlling the drive unit by generating control signals, said unit being designed so that corresponding control signals can be generated using at least one parameter that is used for control or regulation and/or one transfer function, preferably optical, of a predetermined target movement, and for correcting the control of the scanner, at least one current value of a drive unit transfer function can be determined for at least one frequency in a determination step, said drive unit transfer function reproducing the response of the drive unit to control signals generated from a predetermined target movement or a change in a target movement, and in a correction step at least one parameter and/or the transfer function can be corrected as a function of the current value of the drive unit transfer function.

The optical scanner has a drive unit, a beam deflecting element that is movable by the drive unit, e.g., a mirror or a prism, and a scan control unit for generating control signals for the drive according to a target movement which is preferably designed for execution of the inventive method. The drive unit itself has a drive, e.g., an electric motor, a piezo drive or a galvanic drive. The scan control unit may be an electric and/or electronic circuit for delivering control signals according to a predetermined target movement to the drive. The scan control unit or controller and/or the electronic circuit may have in particular a processor, e.g., a digital signal processor which generates control signals for the drive or another control or regulating device of a higher priority than the drive, generating the signals from a preselected target movement which may be defined by parameters, e.g., as a distance-time function for the focus of the beam that is deflected and/or is to be deflected by the scanner in a plane. Depending on the type and intended purpose of the scanner, the target movement may essentially be based on the movement of the beam deflected by the scanner, either in the form of angles or as a point in a reference plane or based on the movement of the beam deflecting element.

To generate the control signals, the scan control unit, i.e., the circuit and/or the processor, uses at least one parameter that is used for control or regulation. Such parameters may be in particular parameters that reproduce the target movement. In addition, they may use a transfer function and/or a frequency response that reflects the correlation between the target movement and the actual movement.

In the simplest case, the transfer function used may be the drive unit transfer function which reproduces the relationship between the target movement and/or the control signals corresponding to the target unit and the position of the drive or a mechanical coupling element, e.g., a shaft that is driven by the drive and moves the beam deflecting element. The drive unit transfer function preferably also includes those components that are used by the measurement of the position of the drive or the coupling element, in particular in the case when this position regulator is used. For example, it may include the effect of a position sensor and/or a feedback sensor for detecting the position of the drive and/or the coupling element and delivering suitable control signals and the following feedback signal processing including an analog-digital conversion, if the latter is provided at all.

Preferably, however, the optical transfer function is used, reproducing the relationship between the target movement of the beam to be deflected and/or the corresponding control signals and the movement induced by the scanner and thus also the properties of the coupling element and beam deflecting element.

The transfer function may in particular be used by the scan control unit to generate predistorted control signals corresponding to the target movement, these control signals being predistorted in such a way that the transfer and/or implementation by the drive leads to the desired target movement with an accurate determination of the transfer function.

The invention is based on, among other things, the finding that, first of all, for accurate control of a scanner, the most accurate possible knowledge of the transfer function of the scanner is required and that, secondly, the transfer function can vary over a period of time. In addition, it has been recognized that the optical transfer function can be divided into two components that are linked together, namely the drive unit transfer function and another component. The other component may describe, among other things, the transfer of the movement of the drive via the movement of the beam deflecting element, which may also be deformed by the movement, to the movement of the beam to be deflected. The drive unit transfer function is preferably defined for performing the method so that it can be measured easily. If a position sensor is used to detect the position of the drive, then the drive unit transfer function advantageously also describes the properties of all units that convert raw signals of a sensor element of the position sensor into values that can be used for correction. For example, electronic circuits for processing, in particular for conditioning the raw signals and optionally also an analog-digital converter may belong here. These components may be arranged so they are offset physically from the actual sensor.

The measurement of the additional component is usually complex and may require, for example, the use of optical auxiliary means such as reference samples in particular. However, it has been recognized that this component changes very little over a period of time in comparison with the drive unit transfer function.

The drive unit transfer function can be determined electrically, i.e., electronically, relatively easily, quickly and accurately, so it is sufficient for an improvement in the calibration and/or control of the scanner to determine only this function and/or at least a component thereof and to correct the control using at least one component thereby ascertained. By linking the function thereby ascertained and/or at least one component thereof to the known prevailing transfer function, the latter may be corrected easily and quickly. To do so, it may be sufficient to perform the correction for only a predetermined frequency which may be selected as a function of the target movement and the properties of the transfer function. In particular in the case of a periodic target movement, the predetermined frequency may be the fundamental frequency of the target movement or one of the harmonic frequencies, i.e., one of the multiples of the fundamental frequency.

Therefore, the invention offers the great advantage that control of the scanner can be corrected easily and quickly so that when there are repeated corrections even over long periods of time, control according to a predetermined target movement will lead to an actual movement that corresponds to the target movement with a very high precision. Since the correction can be performed very quickly, it may be automated in particular and may be accomplished in a manner that is hardly perceptible by the user.

In the determination step, the drive unit transfer function may essentially be ascertained any number of times. In this method, however, the current value of the drive unit transfer function is preferably determined for the preselected frequency by ascertaining an actual position of a drive or a mechanical coupling element of the drive unit as a function of the target movement and/or the change in the target movement or the control signals ascertained therefrom. In the case of the optical scanner, the drive unit therefore preferably has a stepping motor for moving the beam deflecting element and/or a position sensor for sensing the position of the drive or a mechanical coupling element of the drive unit and furthermore the scan control unit is designed so that in the ascertaining step the position of the stepping motor or a position signal of the position sensor is used to ascertain the current value of the drive unit transfer function. This embodiment has the advantage, especially when using a position sensor, that the position signal may be used in ordinary operation of regulating the position of the motor, to which end the drive unit then preferably has a position regulator that controls the motor. The use of a stepping motor allows a simple means of acquisition of the position of the drive and/or the coupling element. A shaft in particular may be used as the coupling element. In any case, this yields a particularly simple design of the scanner.

It may fundamentally be sufficient for the method to be used only as needed. The correction method may then be started manually by the user. However, the method is preferably performed automatically, to which end the optical scanner and/or its scan control unit is designed accordingly.

In a first preferred variant of the method, the determination step and the correction step are repeated in preselected time intervals. The optical scanner preferably has a timer device which repeatedly triggers the scan control unit at predetermined time intervals so that it executes the determination step and the correction step. The time intervals may be selected in particular as a function of the expected change in the properties of the scanner and the required positional accuracy and/or precision in movement. For example, the method may be performed every week or every month.

However, it is also possible to repeat the determination step and the correction step when a preselected total operating time of the scanner since the last correction has been reached. This has the advantage that the correction is performed as a function of the wear which is determined by use, so that even when usage is irregular, a correction is performed early enough.

According to another preferred variant, the determination step and the correction step may be performed in this method each time the scanner is activated or at a predetermined interval of time after each activation of the scanner. In the case of the optical scanner, the scan control unit is therefore preferably further designed so that the determination step and the correction step are performed each time the scanner is activated or at a predetermined interval of time after each activation. The interval of time may be selected in particular so that the scanner or a device containing the scanner will have warmed up after this period of time has elapsed and will have stable operating conditions. This embodiment has the advantage that with a suitable choice of the predetermined interval of time, the correction is performed after a warm-up phase of the scanner and/or a device containing the scanner and thus when conditions are stable. This increases the reliability of the correction.

Essentially it may be sufficient to perform the correction only for a predetermined frequency. In this method, however, it is preferable for the determination step and the correction step to be repeated and for the frequency which is used in these steps to change with each repetition. To do so, preferably in the optical scanner, the scan control unit is further designed so that it repeatedly executes the determination step and the correction step and changes the frequency used in these steps with each repetition. In particular, the fundamental frequency and the harmonic frequencies that are used, i.e., multiples of the fundamental frequency, may be used as the frequency one after the other in a typical periodic target movement with a fixed fundamental frequency. This has the advantage that after a sufficient number of repetitions, the entire transfer function and/or the parameters used for control and/or regulation is updated.

In addition, the determination step and the correction step may preferably be performed for several preselected frequencies in this method. With the optical scanner, the scan control unit is preferably further designed so that the determination step and the correction step are performed for multiple preselected frequencies. This means that when there is a correction, corrections for multiple frequencies may be performed essentially simultaneously and/or in direct succession so that a more comprehensive and/or more accurate correction can be achieved in an advantageous manner.

In the correction step, the correction may be performed in various ways. In this method it is preferable for a deviation in the current value of the drive unit transfer function to be determined in the correction step, said deviation being determined in relation to a corresponding value of the drive unit transfer function that was determined previously and was determined within a predetermined interval of time prior to or after the determination of the value of the optical transfer function currently being used at the frequency and it is preferable for the deviation to be used for the correction. With the optical scanner it is preferable here for the scan control unit to be further designed so that in the correction step, a deviation in the current value of the drive unit transfer function from a corresponding value of the drive unit transfer function that was saved previously and was determined within a preselected interval of time prior to or after the determination of the value of the optical transfer function currently being used at the frequency and for the deviation to be used for the correction. The preselected interval of time is preferably selected so that there is no significant change in the drive unit transfer function nor need any change be expected in this interval of time. The drive unit transfer function is preferably performed immediately before or after the determination of the transfer function, in particular the optical transfer function. Depending on how the transfer function is represented, the deviation may be given as a quotient of the two values or as a difference. If the transfer function is represented in the form of a Fourier transform, e.g., as a complex function, or by two amplitude components for a sine function and cosine function, then the deviation may be given by the quotient of the corresponding values. In the case of a Fourier transform in the form of amplitudes and phases for sine or cosine functions of a Fourier sum, the deviation for the amplitude may be given in the form of a quotient and the deviation in the phases may be given in the form of a difference. This embodiment has the advantage that the correction itself is easy to perform after determining the deviations.

In another preferred embodiment, in this method the correction for at least one frequency is performed at least in the correction step and a model for the frequency dependence of at least one parameter to be corrected and/or the transfer function to be corrected is determined for correction for other frequencies. With the optical scanner, the scan control unit is therefore preferably further designed so that in the correction step, the correction is performed for at least one frequency and a model for the frequency dependence of the parameter to be corrected and/or the transfer function to be corrected is determined for correction for other frequencies. This embodiment has the great advantage that a correction can be performed over the entire required frequency range despite the determination of a value of the drive unit transfer function for only one or only a few frequencies, which can therefore take place rapidly. The model may be a polynomial model, for example, when using values for multiple frequencies. However, it is also possible to use the characteristic of the drive unit transfer function determined as a function of frequency as the model in determining the transfer function or to use a model that is derived theoretically.

The invention is also used to particular advantage in laser scanning microscopes, because these microscopes require scanners that operate with a very high precision to obtain the least possible distortion in images at a high scanning speed. Therefore, the present invention also relates to a laser scanning microscope having an inventive optical scanner.

BRIEF DESCRIPTION OF THE SEVERAL VIEWS OF THE DRAWINGS

The invention will be explained in further detail below as an example on the basis of the drawings, in which.

DETAILED DESCRIPTION OF THE INVENTION

Figure 1:
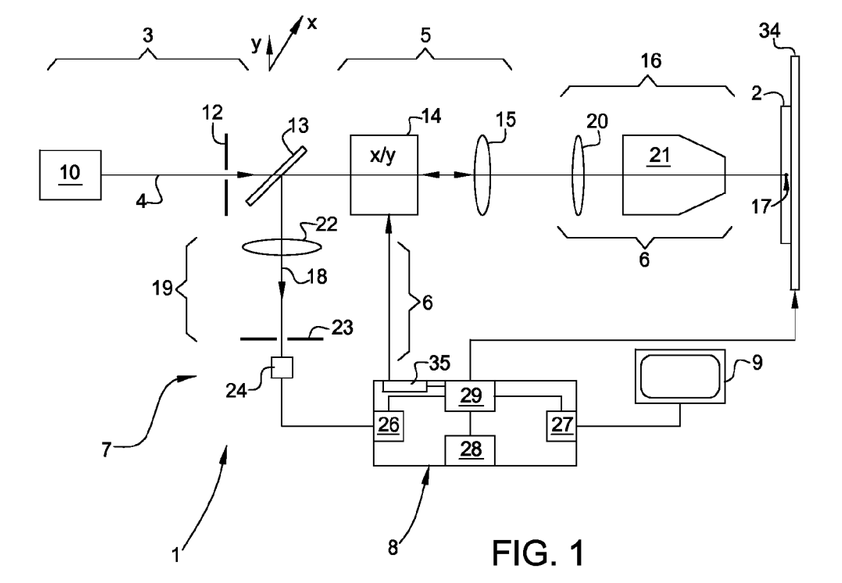
FIG. 1 shows a schematic diagram of a laser scanning microscope.

FIG. 1 shows a simplified diagram of a laser scanning microscope according to a first preferred embodiment of the invention that serves to examine an object and/or a sample 2 via an illumination section 3 for emission of a collimated illumination beam 4, a deflection section 5 for controlled deflection of the illumination beam 4, a mapping optics 6 and a detection unit 7 for detecting recorded image data for at least partial images of the object 2 which are mapped by the mapping optics 6 on the acquisition device 7. A control and analyzer device 8 is connected to the acquisition device 7 and to a display device 9 in the form of a color monitor.

With this laser scanning microscope 1, the sample 2 is mapped by scanning it with the illumination beam 4 in a layer of the sample 2 to be mapped, said beam being focused in the layer and having an approximately dot-shaped cross section there. The illumination section 3 serves to emit the collimated illumination beam 4 with a predetermined beam profile and cross section and to this end has a source 10 for optical radiation, e.g., a laser, along an illumination beam path and has a fine aperture 12 (pinhole aperture) in a conjugated plane with the position of the focus of the illumination beam 4 on the sample 2.

The illumination radiation 4 emitted from the illumination section 3 passes through a beam splitter 13 into the deflection section 5 for controlled deflection of the illumination beam 4 passing through the beam splitter 13. The deflection section 5 therefore has a deflecting device connected to the control and analyzer device 8 and/or has an optical scanner 14 according to a first preferred embodiment of the invention and has a scanning lens 15.

Figure 2:
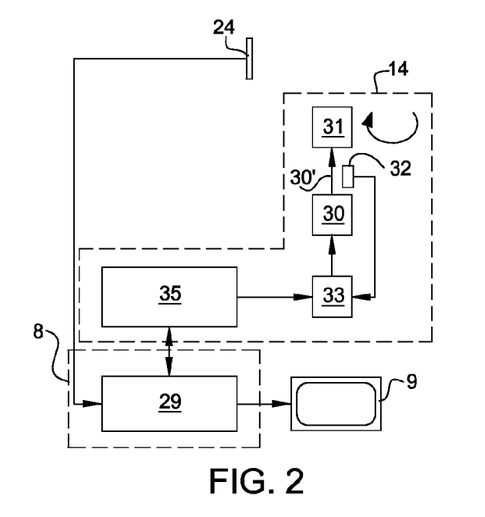
FIG. 2 shows a schematic block diagram of components of the laser scanning microscope in FIG. 1 which are relevant for an optical scanner of the laser scanning microscope.

The optical scanner 14 is designed to pivot the illumination beam 4 in a plane orthogonally to the direction of the illumination beam 4 upstream from the deflection device, i.e., orthogonally to the plane of the drawing in FIG. 1. To this end, it has two drive units which can be controlled by the control and analyzer device 8, driving to drives that can be controlled independently of one another by the scan control unit 35, of which only the drive 30 for movements in the x-direction is shown in FIG. 2 and two beam deflecting elements, each pivotable about an axis by means of the drives, namely in this example the mirror, of which FIG. 2 shows only the mirror 31 that is driven by the drive 30 via a coupling element 30', namely a shaft. The drive units are connected to a joint scan control unit 35 for delivering control signals according to a target movement in the x-direction and a target movement in the y-direction.

Galvanic drives are used in this example. The axes of rotation about which the mirrors can be rotated run orthogonally to one another, whereby the mirror 31 deflects the illumination beam 4 in the x-direction in a controlled manner according to the triggering of the drive 30. The other mirror causes a deflection in the y-direction. In addition a capacitive position sensor is provided for each of the drives for detecting the position of the respective drive 30 or of the coupling element 30' and/or the mirror and emitting corresponding feedback signals, and a position regulator that is connected to the position sensor and to the control and analyzer device 8 for transmitting control signals, of which FIG. 2 again shows only the position sensor 32 and the position regulator 33. In response to a control signal, the position regulator 33 regulates the position of the drive 30 to a position defined by the control signal and does so by using position and feedback signals from the position sensor 32 so that the position can be adjusted with great accuracy, at any rate when there is a slow movement, but can be adjusted as a function of the properties of the position sensor 32.

The scan control unit 35 may have at least one digital signal processor for generating control signals for the optical scanner 14 and in particular for the drives via at least one digital signal processor, where said digital signal processor which has access to a memory (not shown) or an area of a memory 28 of the control and analyzer device 8.

The deflected illumination beam 4 emerging from the deflection section 5 is focused by the microscope lens 16 in a focus 17 on or in the sample 2. For selecting the position of the focus 17 in the z-direction, i.e., in the depth of the sample, the position of a sample table 34 can be adjusted in the z-direction in a known manner by means of an integrated drive connected to the control and analyzer device 8 through corresponding signals of the control and analyzer device 8.

The focus 17, i.e., more precisely the detection radiation 18 emitted by the focus 17, e.g., fluorescent radiation excited by the illumination radiation in the sample 2 is mapped by the mapping optics 6, which includes the microscope lens 16 that becomes larger along a detection beam path, the beam splitter 13 and a detection optics 19 mapping the focus 17 confocally on the acquisition device 7.

The microscope optics 16 comprises a tube lens 20 and a microscope objective 21.

The beam splitter 13 is designed to allow at least a portion of the illumination beam 4 to pass through and deflect the detection radiation 18 to the detection lens 19.

The deflection section 5 which descans the detection radiation 18 is arranged between the microscope lens 16 and the beam splitter 13. Descanning is understood to mean that the deflection section is deflected by the focus 17 traveling on or in the sample according to the deflection of the illumination beam 4 of the radiation emitted into a fixed section of the detection beam path, in particular to the beam splitter 13, so that the section of the detection beam path between the sample 2 and the deflection section 5 is pivoted according to the movement of the section of the illumination beam path between the deflection section 5 and the sample 2, while the remainder of the detection beam path remains unchanged, however.

The detection radiation 18 from the focus 17, fluorescent radiation excited by the illumination radiation or illumination radiation reflected back from the focus 17 by the sample 2 passes through the microscope lens 16 and the deflection section 5, is deflected by the beam splitter 13 and then goes to the confocal detection lens 19 which comprises a detection lens or lens group 22 and a fine hole aperture, i.e., pinhole aperture 23. The detection lens and/or lens group 22 is designed and arranged in such a way that detection radiation coming out of the focus 17 is focused in the orifice of the pinhole aperture 23 and passes through it, but radiation from other areas of the sample 2 essentially cannot pass through the pinhole aperture 23. In this way there is confocal mapping of only one layer of the sample 2 running essentially parallel to the x-y plane with the focus 17. The size of the opening in the pinhole aperture 23 determines, among other things, the depth resolution of the laser scanning microscope 1 in a known way.

Behind the pinhole aperture 23 there is optionally a filter (not shown in FIG. 1) for the detection optics 19, such that the filter does not allow unwanted radiation components to pass through or they pass through only to a greatly diminished extent or in the case of fluorescence tests the illumination radiation reflected back out of the focus 17 is not allowed to pass through or passes through only to a greatly diminished extent.

The detection radiation 18 then goes to the acquisition device 7. The acquisition device 7 has a detection element 24, namely in the example shown here a photomultiplier on which the focus 17 is mapped and which detects the detection radiation which has passed through the pinhole aperture 23, generating and emitting detection signals.

The acquisition device 7 and in it in particular the detection element 24 are connected via a signal connection to the control and analyzer device 8 which serves to control the deflection section 5 and drive the sample table 34 and also to analyze the signals of the acquisition device 7, more precisely the image data acquisition signals and/or detection signals of the photomultiplier 24 and to form corresponding images. These images may be displayed with the display device 9, namely a color monitor in the present example, which is connected to the control and analyzer device 8 via a signal connection.

The control and analyzer device 8 is designed as a data processing device and has an acquisition interface 26 for the acquisition device 7 and/or its photomultiplier 24, a graphics interface 27 connected to the display device 9, a memory 28 for storing data and instructions of a computer program and a microprocessor 29 that is connected to the interfaces 26 and 27 and to the memory 28 and at least partially executes the method described below in execution of the instructions. Additional instructions of a computer program that allows operation and control of the laser scanning microscope, e.g., by input of a scanning speed and a scanning amplitude via a graphical user interface, is saved in the memory 28 or, more precisely, in a nonvolatile portion of the memory 28.

As an alternative the program can also be stored on a data medium such as a CD which can be read via a CD drive (not shown) that is connected to the microprocessor 19.

The microprocessor 29 controls, among other things, the scan control unit 35, namely the signal processor of the scan control unit 35 in the example. In other exemplary embodiments, it is possible for the microprocessor 29 to form a part of the scan control unit 35, to which end it is then programmed accordingly. The scan control unit and the control and analyzer device are then partially integrated.

In addition, devices for synchronization of the acquisition of intensities by the photomultiplier 24 with the position of the scanner 14 are also provided in the control and analyzer device 8, these devices being implemented in part by the microprocessor 29 and in addition optionally comprising other components (not shown in FIG. 1) with which those skilled in the art are familiar.

Figure 7:
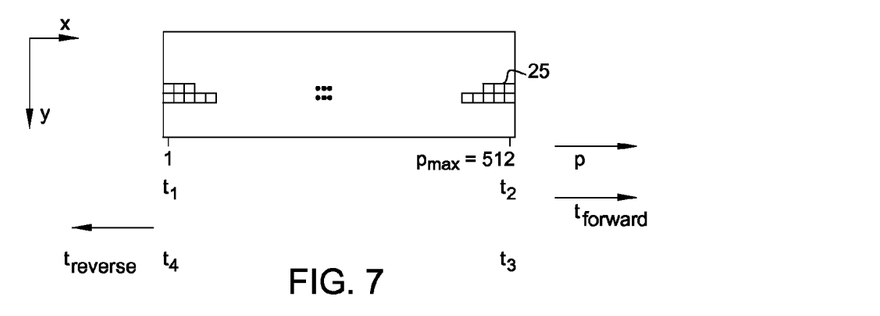
FIG. 7 shows a schematic diagram of a pixel design of an image detected with the laser scanning microscope in FIG. 1.

Images of a layer in the sample 2, whose layer thickness is determined by the size of the opening of the aperture 23 and by the properties of the mapping optics 6, are reproduced by a rectangular arrangement of image elements, i.e., pixels 25, which have been shown with a reduced number of pixels in comparison with the actual arrangement, as indicated schematically in FIG. 7 for the sake of clarity.

The acquisition of a recorded image of a layer takes place as follows: the radiation source 10 emits the illumination beam 4 which is guided by means of the scanner 14 line-by-line in the x-direction over the sample 2. Detection radiation emitted from there is sent via the microscope optics 16 to the deflection section 5 where it is descanned. After deflection by the beam splitter, the confocal components are acquired by the acquisition device 7 and corresponding signals are transmitted to the control and analyzer device 8. Then after the end of acquisition of a line of pixels, the focus moves in the y-direction, superimposed on the movement in the x-direction, whereupon the next line in the x-direction can be detected, e.g., by reversing the direction of travel.

The movement in the x-direction takes place periodically. The target movement is depicted as an example in FIG. 3, where s denotes the position of the focus in the x-direction and t denotes the time. Ideally the focus moves in the x-direction on its path from a first end position to a second end position and back into the first end position, i.e., periodically, whereby the movement from one end position into the other takes place in a straight line and uniformly at least in the effective area that is used for acquisition of an image and has the width 2A in FIG. 3. This movement is characterized by the two straight lines 39 in FIG. 3.

In fact however, the focus cannot be accelerated with infinite acceleration from one of the end positions or decelerated with infinite deceleration in approach to the end position. Therefore, there follows at first at the beginning of a period, i.e., starting from a first end point, namely the point in time 0 in FIG. 3, there is an acceleration to a subsequently desired speed which is reached at time $t_1$. In the following period of time until time $t_2$ there is a linear and uniform back-and-forth movement during which image data is acquired. Then in the time between $t_2$ and $t_3$ the drive 30 and the mirror 31 and thus the focus 17 are decelerated to the speed 0 which is reached in the second end point. From there the drive 30 and the mirror 31 are accelerated in the reverse direction until time $t_4$ at which the same speed is reached again as in the forward movement. At the same time in the period of time between $t_2$ and $t_4$ by triggering the drive for the movement in the y-direction, the focus is moved in the y-direction for a predetermined period of time and/or by a predetermined distance so that in the reverse movement the next line of an image can be acquired. In the following period of time $t_5$ the linear uniform reverse movement takes place, during which image data can be acquired again. Between times $t_5$ and $t_6$ the drive 30 and the mirror 31 are decelerated again, whereby again there is a movement of the focus 17 in the y-direction to the next line. The areas covered between times $t_1$ and $t_2$ or $t_4$ and $t_5$ thus constitute an effective area for image acquisition, and the width 2A is twice the amplitude A of the scanning movement.

During the linear uniform back-and-forth movement, intensities and/or energies of the detection radiation are determined at constant time intervals by the photomultiplier 24 and corresponding signals emitted by the photomultiplier 24 are input via the interface 26, assigned to the pixels and saved in the memory 28 of the control and analyzer device 8. This means that the number of pixels of a line is defined by the number of points in time at which the intensity of the detection radiation is acquired. The intensity values acquired and assigned to the pixels are saved as a matrix with elements I(i, p) whereby the index p denotes the position of the line i. The distance of the areas depicted by the pixels in the image from one another is obtained as the product of the speed of the focus 17 and the interval of time Δt between the acquisition of successive intensities. Since the time continues to run in the periodic movement but with the movement in the x-direction each location is passed over twice in a period, so the intensities are saved directly in the control and analyzer device 8 in accordance with their pixels and thus assigned to locations. This is illustrated in FIG. 7, where intensities for the pixel with the index j=1 nearest the first end position, for example, are acquired at points in time $t_1$ and $t_2$ and intensities for the pixel with the index j=$p_{max}$ nearest to the second end position (in example 512) are acquired at points in time $t_3$ and $t_4$ and saved directly accordingly.

Figure 3:
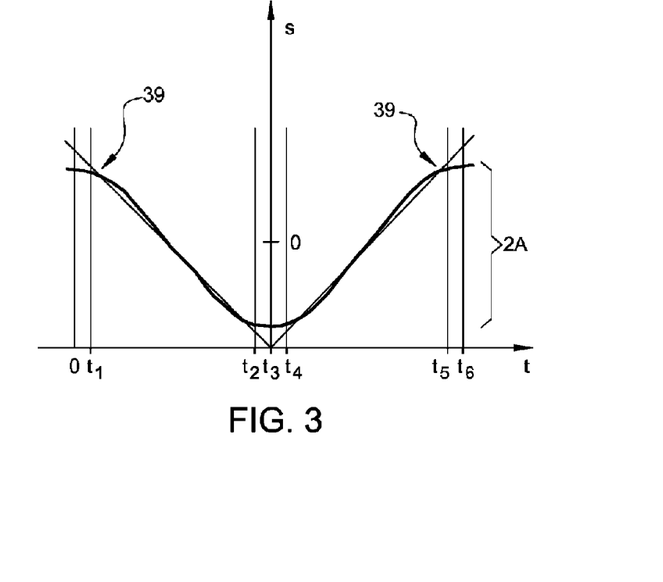
FIG. 3 shows a simplified distance-time diagram for a target movement and an approximate target movement.

The control signals corresponding to the target movement are generated by a synthesis of frequency components. To do so, first the target movement is represented as a Fourier series with a period of fundamental frequency f corresponding to the x movement. For the triangular movement illustrated in FIG. 3, the following approximate representation is obtained for the deflection $s_{target}(t)$ of the focus 17 through appropriate deflection of the mirror 31 as a function of time t:

$$s_{target}(t) \approx \sum_{k=1}^{N} s_{ksetpoint} \cos(2\pi \cdot k \cdot f \cdot t + \varphi_{ktarget})$$

$$= \frac{8}{\pi^2} \sum_{k=1}^{N} \frac{a_{ksetpoint}}{k^2} \cos(2\pi \cdot k \cdot f \cdot t + \varphi_{ktarget}),$$

where $s_{ktarget}$ and $a_{ktarget}$ denote amplitude coefficients and $\varphi_{ktarget}$ denotes phase coefficients for the frequency component with the frequency k·f. The greater the positive natural number in N>1 is selected to be, the more accurately the Fourier sum represents the target movement. In practice, N is selected so that a predetermined precision in the representation is achieved. The curve in FIG. 3 represents the Fourier sum for N=1.

Figure 4:
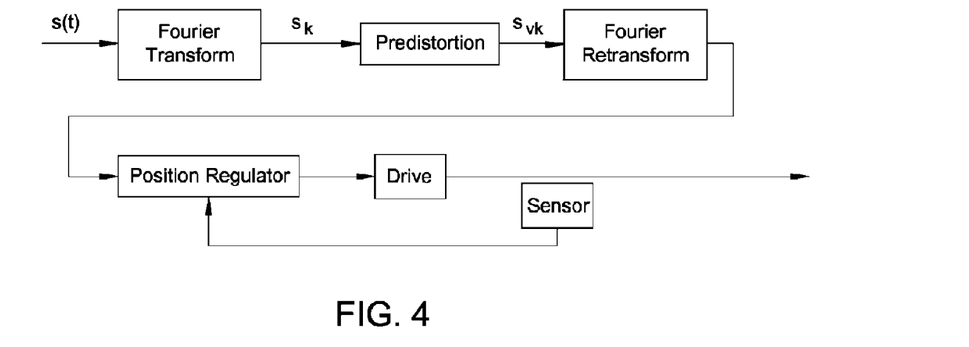
FIG. 4 shows a block diagram for the generation of control signals for a drive of the scanner in FIG. 2.

The scan control unit 35 generates the control signals that are supplied to the position regulator 33. The control signals are preferably generated so that the mobile beam path section and/or the focus 17 executes the target movement in the best possible approximation. To do so a predistortion (see FIG. 4) is performed, taking into account the influence of all the intermediate components, e.g., the control electronic system including the drive and the mechanical and optical components such as mirrors, etc. in the form of an optical transfer function U. When using the Fourier representation of the target movement as described above, the optical transfer function is given by two components, namely an amplitude component $U_A$ and a phase component $U_P$ which depend on the frequency. Thus, in a representation of the control signals corresponding to a target movement as a Fourier series and/or sum:

$$s(t) \approx \sum_{k=1}^{N} s_k \cos(2\pi \cdot k \cdot f \cdot t + \varphi_k)$$

with Fourier amplitudes $s_k$ and Fourier phases $\varphi_k$ which are obtained from the corresponding Fourier components of the target movement, and a corresponding representation of the movement of the focus:

$$s_{focus}(t) \approx \sum_{k=1}^{N} s_{focus,k} \cos(2\pi \cdot k \cdot f \cdot t + \varphi_{focus,k})$$

the following equations hold:

$s_{focus,k} = s_k \cdot U_A(k \cdot f)$ and $\varphi_{focus,k} = \varphi_k + U_P(k \cdot f)$, where $U_A(k \cdot f)$ is the amplitude component of the transfer function and $U_P(k \cdot f)$ is the phase component for the frequency kf.

In order for $s_{focus}$ to actually follow the target path, the predistortion $s_{V,k} = s_k / U_A(k \cdot f)$ and $\varphi_{V,k} = \varphi_k - U_P(k \cdot f)$, is calculated and the position regulating device is controlled with control signals according to the Fourier series and/or sum with predistorted amplitudes $s_{V,k}$ and predistorted phases $\varphi_{V,k}$ of the frequency components. The position regulating system 33 and the position sensor 32, the function of which is taken into account in the transfer function, then ensure accurate control of the drive so that the required position is in fact reached (see FIG. 4). With a complete and accurate knowledge of the transfer function, then the focus 17 will execute the target movement with exactly linear systems.

The optical transfer function, however, is known at least theoretically for a laser scanning microscope based on its design. In fact, the actual transfer function usually deviates from the theoretical, e.g., due to ambient influences and drift in the properties of the components used so that by controlling according to a target movement, an actual movement that may deviate from the target movement is achieved. To eliminate the deviations, the optical transfer function must be determined. This may be accomplished with the following determination and/or calibration method, for example.

Figure 5:
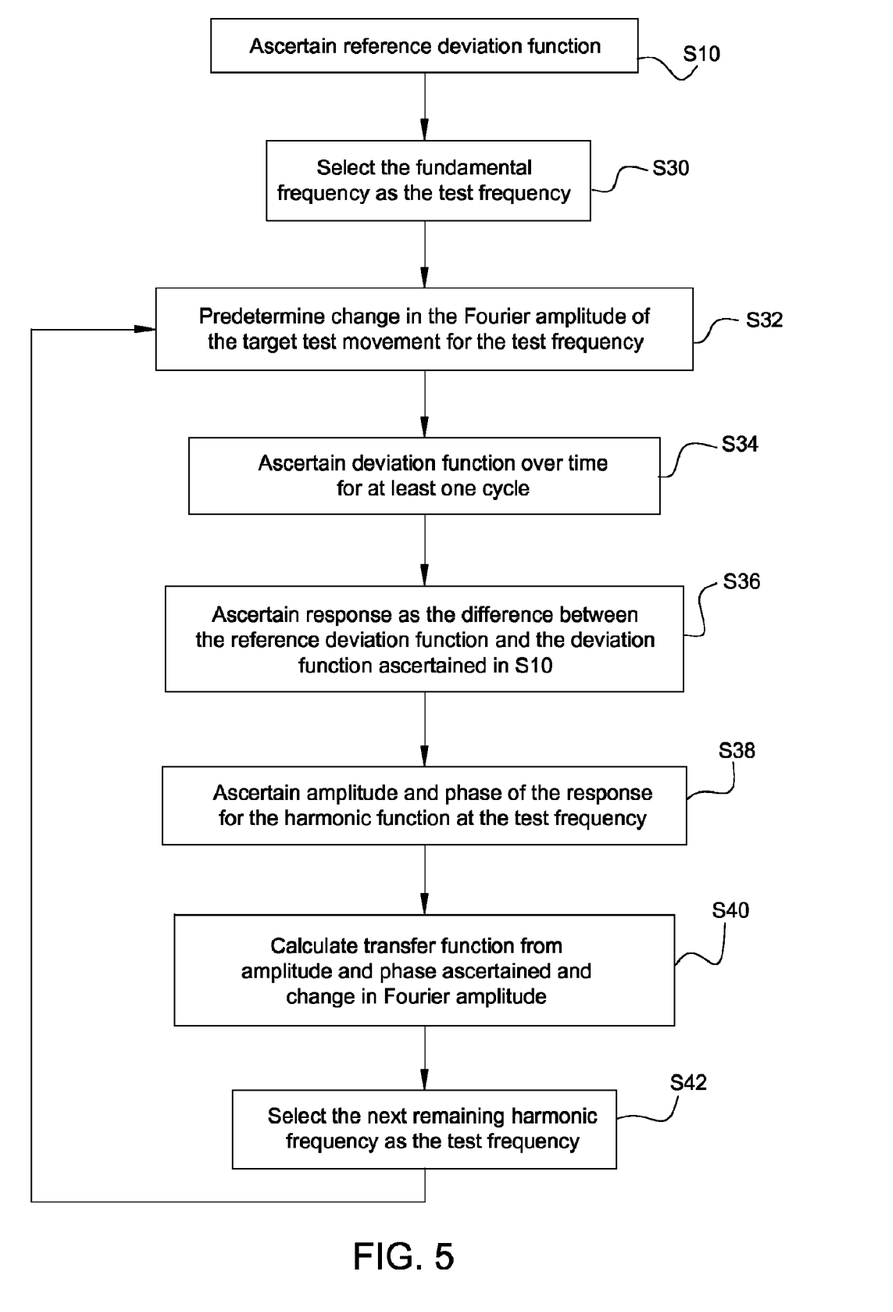
FIG. 5 shows a simplified flow chart for a method for determining an optical transfer function.
Figure 6:
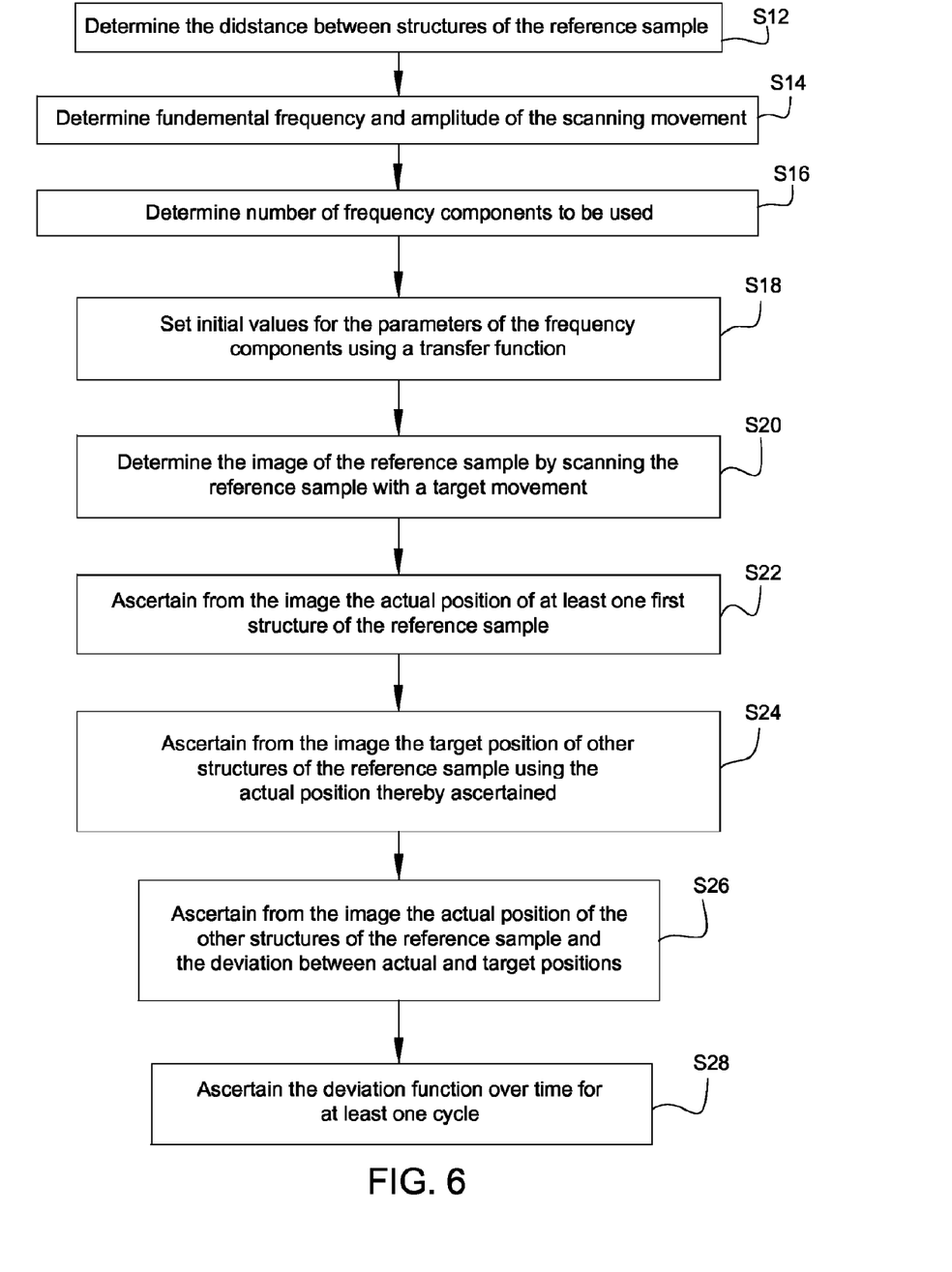
FIG. 6 shows a simplified flow chart for substeps of the method depicted in FIG. 5.

With this calibration method which is depicted schematically in FIGS. 5 and 6, a reference sample 2 is used as the sample having structures that can be detected with the laser scanning microscope 1. This presupposes that at least the forms of the structures and their position in relation to one another are known. An image of the reference sample is created using a target test movement from which the actual positions of the structures are ascertained and after ascertaining the target positions, they are compared with the target positions of the structures in the FIGURE. On the basis of the deviations between the target positions and the actual positions, corrections for the optical transfer function and/or its frequency components can then be ascertained so that an improved, preferably accurate transfer function is obtained when they are used.

In the present exemplary embodiment, a sample is used with a periodic line grid (see FIG. 8) in which the lines 36 are at a distance from one another, said distance being greater than twice the distance of the focus positions on the reference sample 2 in two successive acquisitions of the intensity and/or energy during a movement in the x-direction.

After positioning the reference sample 2 on the sample table 34, the control and analyzing device 8 together with the scan control unit 35 performs the following method, to which end the microprocessor 29 and the scan control unit 35 and/or a digital signal processor therein process instructions of one or more computer programs saved in the memory 28 in the control and analyzer device 8.

It is assumed here that values of a transfer function are already on hand and have been saved. If there are no known specific values for the scanner, it may initially be assumed, for example, that the amplitude components $U_A$ for all the frequencies in question assume a value of 1 and the phase components $U_P$ assume a value of 0.

First in block S10 a reference deviation function is ascertained, reflecting the deviations between the target positions and the actual positions and thus the actual movements, and the reference deviation function is determined using the saved current transfer function.

The steps of block S10 are depicted more precisely in FIG. 6.

First, the control and analyzer device 8 reads in step S12 the distance between the lines 36 on the reference sample via a graphical user interface. In other exemplary embodiments, the distance between the lines may also be saved in a nonvolatile portion of the memory 28 and then the value is read out of the memory 28.

In the next step S14 the control and analyzer device 8 also obtains the frequency f and the amplitude A of the target scanning movement, likewise via the graphical user interface. The frequency f is the fundamental frequency of the Fourier sum to be formed subsequently. For the case when scanning programs, i.e., combinations of scanning speeds and amplitudes, have already been predetermined, it is sufficient for the user to select the corresponding scanning program and then the control and analyzer device 8 reads out the corresponding values from the nonvolatile portion of the memory 28.

In the following step S16 the control and analyzer device 8 also acquires the number N of the frequency components to be used, which can be acquired like the parameters of the scan program. The number N should advantageously be selected so that the frequency N·f is less than a predetermined cut-off frequency which may be selected as a function of the properties of the position regulating system 33 and the drive 30, for example. In addition the number N should not be greater than a predetermined maximum number which is selected as a function of the desired precision in the scanning movement. The number N is preferably between 10 and 50 so as to achieve the accuracy required for laser scanning microscopes.

In step S18 the control and analyzer device 8 sets initial values for the parameters that are used for the control or regulation and are to be corrected, i.e., the amplitude $s_k$ and the phases $\phi_k$ for the frequency components for frequencies k f, where k=1, . . . N. As already mentioned, the scan frequency f is the fundamental frequency, while the frequencies k f are the harmonic frequencies for k>2. From the parameters that are used and are to be corrected, it then determines the control signals using the optical transfer function as described above, and performing the predistortion; these control signals are then delivered to the position regulating system 33 in step S20 which follows to acquire an image of the reference sample 2. The optical transfer function is saved as a table in the nonvolatile portion of the memory at predetermined interpolation points, whereby either the values used last or estimated values may be used. If values of the transfer function at the required frequencies have not been saved, they may be obtained by interpolation.

In step S20 by periodic scanning of the reference sample 2 according to the calculated control signals at least in the x-direction, an image of the reference sample 2, i.e., an image of at least a section of the reference sample 2 is acquired. The reference sample 2 is oriented so that the grid lines are orthogonal to the x-direction in good approximation. The scan amplitude is selected as a function of the distance between the lines and the number N of the frequency components so that at least as many grid lines are acquired as there are frequency components being used. The image is then saved in the control and analyzer device 8 in the memory 28 as described above. In another exemplary embodiment, it is also possible to acquire the image with y-deflection between the movement in the x-direction.

Figure 8:
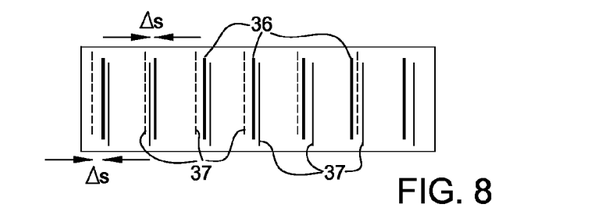
FIG. 8 shows a schematic diagram of a test sample with target positions of line structures and with actual positions of the line structures detected in a back-and-forth movement, FIGS. 9a, b shows diagrams in which deviations between target positions and actual positions of line structures for the back-and-forth movement have been plotted as a function of the pixel numbers.

FIG. 8 shows a detail from the reference sample 2 and the image acquired. The lines 36 on the reference sample 2 are not acquired at the locations where they should be located. Instead, the lines are acquired during the forward movement along the lines 37 with large dots and during the reverse movement on the lines 38 with small dots, resulting in deviations Δs in the positions.

To be able to quantitatively detect the deviations, first the target layers of the structures, i.e., grid lines in the acquired image are determined. This does not require positioning the sample with extremely high precision on the slide stand.

Therefore in step S22 the actual position of at least one first structure of the reference sample is determined from the image, namely in the example of the line which was determined during the forward movement in the image as being the center of the scan line, i.e., the center of the effective area, i.e., the next to be determined. Then the actual position of a line in the image closest to the line ascertained in the forward movement is ascertained during the reverse movement. Then the average of the actual positions thus ascertained in the forward and reverse movements is calculated and saved as the calculated target position of the line.

In step S24 the target positions of the remaining lines of the reference sample 2 are ascertained in the image and saved, starting from the actual position of the middle line using the known spacing of the structures and/or lines from one another.

Figure 9A:
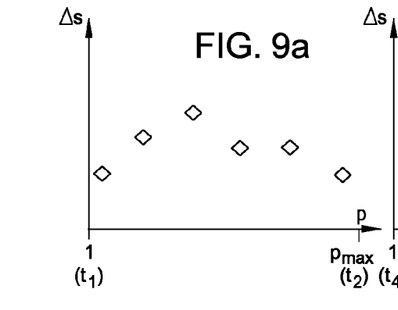
Figure 9B:
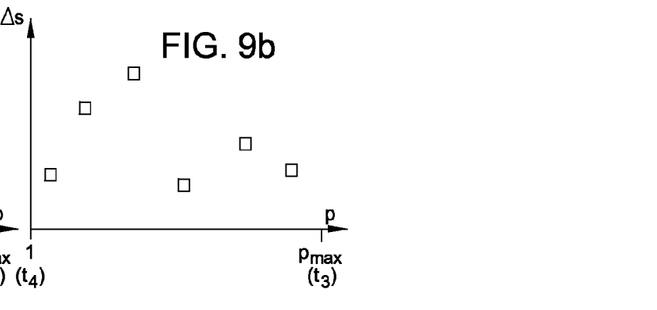

In step S26 the actual positions of the remaining lines and their deviations from the target positions are then determined separately for the back-and-forth movements. To do so first using known methods the actual positions of the structures and/or lines in the image are ascertained. In this process, the actual positions are allocated to pixels, i.e., to the numbers thereof and the back-and-forth movements. Then the deviation Δs between the target position and the actual position is calculated for the lines and saved. Deviations are depicted in FIG. 9a for the forward movement and FIG. 9b for the reverse movement as a function of pixel number p as an example. For a better understanding of the following steps as well, the times when the values were acquired are also indicated below the pixels. The actual positions of the lines can be determined with sub-pixel accuracy by interpolation of the intensity variations.

In step S28, a deviation function representing the deviations Δs as a function of time t during the movement and not as a function of pixel number p is then determined. Such a function which is given only by the values at the acquisition points in time is represented partially and as an example in FIG. 10. The deviation values thereby acquired and assigned to the pixels are rearranged so that they are arranged in order of their acquisition time. The values in the five different periods of the test movement are handled different here.

Figure 10:
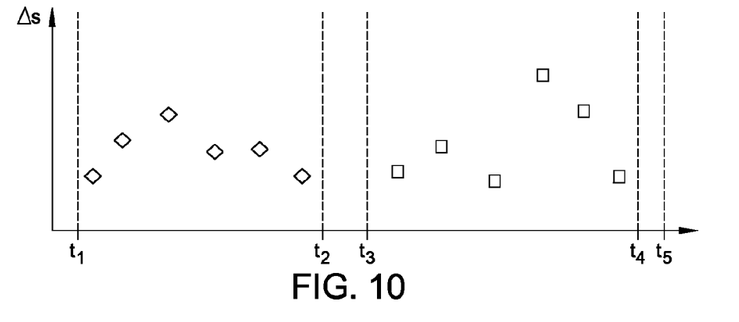
FIG. 10 shows a diagram in which the deviations in FIGS. 9a and 9b have been plotted as a function of time.

In the time between 0 and $t_1$ when the drive 32 and the mirror 33 are accelerated from a standstill at the reversal point and/or at the first end position of the movement to the desired scanning speed, no deviations are ascertained. Therefore no pixels need be depicted for this period of time.

In the forward movement between the times $t_1$ and $t_2$ the scanner 14 moves the focus 17 at a speed that is at least approximately constant, depending on the quality of the current calibration, whereby the intensity values and/or energy values are acquires at constant intervals. These values are assigned in succession to pixels with an ascending ordinal number for the y-direction. Therefore, the acquisition times $t_p$ are assigned as times to the pixels and/or the deviations. These are obtained from the ordinal number p of the pixel multiplied by the constant interval of time $\Delta t$ between the acquisition of immediately successive intensity values with respect to the time $t_1$:

$$t_p = p\Delta t + t_1$$

Therefore, no rearrangement is required.

No deviations are determined between the times $t_2$ and $t_3$, i.e., the reversal time for braking to the second end position and acceleration from the second end position in the direction of the first end position, so that here again no intensities need be detected.

In the reverse movement between the times $t_3$ and $t_4$, the scanner moves the focus 17 at a speed that is at least approximately constant in accordance with the quality of the prevailing calibration, whereby the intensity and/or energy values are obtained at constant intervals. However, because of the reverse movement, these are assigned to pixels in chronological succession with descending ordinal numbers for the y-direction. Therefore, the acquisition time $t_p$ is assigned to each pixel for the reverse movement, this acquisition time being obtained, for example, from the maximum number $p_{max}$ of pixels acquired, the ordinal number p of the respective pixel and the interval of time between the acquisition of the intensity for two successive pixels and time $t_3$ as follows:

$$t_p = (p_{max} - p)\Delta t + t_3$$

These times are assigned to the deviations for the pixels in the reverse movement, whereby they are rearranged according to the times $t_p$ by reversing their order.

Again no deviation values are ascertained in the period of time between times $t_4$ and $t_5$ during which the drive 32 and the mirror 33 are decelerated in the first half of the reversing movement, then reaching a speed of zero in the first end position.

The result of this step is a reference function, i.e., curve for the deviations in the actual test movement from the target test movement, determined on the basis of a bidirectionally recorded image of the reference sample with known structures in their relative positions in relation to one another. The interpolation points at which the deviations, i.e., the values of the deviation function, are given, are not equidistant here and instead gaps caused by the reversal periods occur here.

In step S30 a test frequency is set at the fundamental frequency and a parameter $k_{test}$ is set at the value 1.

In step S32 a frequency component Z(t) with the test frequency $k_{test}f$ is added to the control signal, the amplitude $\delta s$ preferably being selected so that, first of all, it is definitely smaller than the value of the amplitude $s_{ktest}$, but secondly, a change in the deviation $\Delta s$ induced by this change can still be detected with only a slight error. The phase $\phi_z$ of the added harmonic function is advantageously selected so that the resulting deviation curve is approximately symmetrical with the midpoint of the back-and-forth movement. This facilitates the analysis of the response to the change.

Then the steps S18 through S28 are performed again with the altered frequency components as output values for determining the initial values, in which case a modified deviation function is obtained. These steps are represented by a block in FIG. 5.

In step S36 the differential function of the deviation function ascertained in block and the reference deviation function obtained in block is then ascertained. The difference is the response of the scanner to the additional excitation applied, which is described by the frequency component Z(t). Assuming a linear system, the response is in turn a harmonic function with the test frequency but with an altered amplitude and phase in comparison with the frequency component of the target test movement.

Therefore, in step S38 the amplitude $A_m$ and the phase $P_m$ of the differential function and/or the response function are ascertained by adjustment with a harmonic function.

In step S40, the transfer function of the scanner is then corrected by altering the frequency component of the transfer function for the test frequency. To do so, the amplitude component $U_A$ and the phase component $U_P$ are ascertained on the basis of the amplitude $A_m$ and the phase $P_m$ of the response curve and the amplitude $\delta s$ and phase $\phi_z$ and are saved instead of the values saved previously. In another exemplary embodiment, the amplitude component $U_A$ and the phase component $U_P$ may be ascertained on the basis of the amplitude and phase of response curve and the amplitude and phase may each be ascertained as a sliding average over several measurements, e.g., four or five measurements, In step S42 the value $k_{test}$ is then incremented by 1. If the resulting value is smaller than N, then the test frequency is set at the value $k_{test} \cdot f$ and the method is continued with step S32. Otherwise the correction method is terminated.

In this way the transfer function of the scanner is corrected over the entire frequency range used so that the deviations between the target movement and the actual movement of the focus 17 are reduced, namely being minimized in the ideal case. This correction is at the same time to be regarded as a determination of the optical transfer function.

Immediately after the determination of the optical transfer function, a drive unit transfer function is determined; when using the Fourier representation mentioned above, this transfer function also has an amplitude component $U_{A,el}$ and a phase component $U_{P,el}$.

This drive unit transfer function is determined by the scan control unit 35 and/or the signal processor contained therein as follows.

For the fundamental frequency and each of the harmonic frequencies used, a harmonic control voltage of a known amplitude is generated via the scan control unit 35 and sent to the drive 30. The feedback signal of the position sensor 31 is ascertained, this signal also being a harmonic function of the same frequency, but usually with a different amplitude and a different phase. The ratio of the amplitude of the feedback signal to the amplitude of the control voltage is used as the frequency component of the amplitude component $U_{A,el}$, and the difference between the phase of the control signal and the phase of the feedback signal is used as the frequency component of the phase component $U_{P,el}$. The values ascertained for the respective frequencies, like the values of the optical transfer function, are saved in a table as a function of the frequency.

In the correction method according to a first preferred embodiment of the present invention, a correction is now performed starting from the stored optical transfer function and the stored drive unit transfer function.

Therefore, the scan control unit 35 is programmed so that, after activation of the scan control unit and after a predetermined warm-up time of approximately five minutes since turning on the scanner 14 in this example, it ascertains current values $U_{A,el\ akt}(k_{test} \cdot f)$ and $U_{P,el\ akt}(k_{test} \cdot f)$ for the drive unit transfer function for a saved frequency $k_{test} \cdot f$ as described above. In doing so, it has a timing device implemented via software to monitor the course of the predetermined warm-up time.

In the next step, the optical transfer function is then corrected according to the following equations in which, for the sake of clarity, the optical transfer function now appears as $U_{optical}$ instead of simply U to facilitate a differentiation:

$$U_{A,optical,corr}(k_{test}f) = \frac{U_{A,optical}(k_{test}f)}{U_{A,el}(k_{test}f)} U_{A,el,akt}(k_{test}f) \text{ and}$$

$$U_{A,optical,corr}(k_{test}f) = U_{P,optical}(k_{test}f) - U_{P,el}(k_{test}f) + U_{P,el,akt}(k_{test}f).$$

The values $U_{A,optical}(k_{test}f)$ and $U_{P,optical}(k_{test}f)$ saved last are then replaced by the values thus obtained in memory 28.

Next the index $k_{test}$ is incremented by 1. When it exceeds the maximum value N, $k_{test}$ is reset at 1 so that in the next correction, a correction of the fundamental frequency is performed.

Over a period of time, this therefore yields a correction for all frequencies.

In another preferred embodiment, the programming of the scan control unit 35 and optionally the control and analyzer device 8 is modified in such a way that the determination step and the correction step are performed for several preselected frequencies. The frequencies, e.g., five frequencies with approximately 30 harmonic frequencies, are distributed uniformly over the entire frequency range used. By means of an interpolation model, e.g., equalizing splines in a double logarithmic display, values for the frequencies in between can then be interpolated. When repeating the correction, five other frequencies, each incremented by the fundamental frequency, for example, are used. In this way a better correction can be achieved each time the method is performed.

In other preferred embodiments, it is also possible to use different models in which a functional form of the frequency dependence is predetermined by a parameterized function. The parameters may then be determined by fitting.

In another preferred embodiment, through appropriate programming of the scan control unit 35 and the control and analyzer unit 8, triggering of the correction method may be started manually as needed either as an alternative or in addition.

In yet another preferred embodiment of the method, in contrast with the first exemplary embodiment, the transfer function is not corrected and instead the parameters $s_k$ and $\phi_k$ representing the target movement and/or the corresponding control signals are corrected. To do so, the programming of the scan control unit 35 is revised accordingly while the other components of the scanner and the laser scanning microscope remain unchanged so that the statements made regarding the previous exemplary embodiments are also applicable here. The equations for the corrected Fourier amplitudes $s_{ktest,corr}$ and Fourier phases $\phi_{ktest,corr}$ can then be written as follows:

$$S_{ktest,corr} = \frac{U_{A,el}(k_{test}f)}{U_{A,elakt}(k_{test}f)} S_{ktest} \text{ and}$$

$$\varphi_{ktest,corr} = \varphi_{ktest} + U_{P,el}(k_{test}f) - U_{P,el,akt}(k_{test}f),$$

where $s_{ktest}$ and $\phi_{ktest}$ denote the parameter values saved before the correction and ascertained at the same time and saved at the same time as $U_{A,el}$ and $U_{P,el}$.

The triggering of the scanners is then performed with the parameters $s_{ktest,corr}$ and $\phi_{ktext,corr}$ starting at this point in time. The original parameters $s_{ktest}$ and $\phi_{ktest}$ of the control signals and the respective parameters $U_{A,el}$ and $U_{P,el}$ of the transfer function are kept in the memory 28 for correction of other frequency components and/or for renewed subsequent correction of the same frequency components.

What is claimed is:

1. Method for correcting a control of an optical scanner (14), having a beam deflecting element (31) for deflection of a beam of optical radiation and a drive unit (30, 30', 35) for moving the beam deflecting element (31), comprising the steps of:
   determining a current value of a drive unit transfer function for at least one predetermined frequency, said drive unit transfer function reflecting the response of the drive unit (30, 30', 35) to control signals determined from a predetermined target movement or a change in a target movement of the focus of the beam;
   correcting as a function of the current value of the drive unit transfer function, at least one of:
      at least one parameter for control or regulation of a predetermined target movement of the focus of the beam and
      a transfer function of a predetermined target movement of the focus of the beam;
   generating control signals based on at least one of:
      the at least one parameter as corrected in the correcting step and
      the transfer function as corrected in the correcting step; and
   moving the beam deflecting element (31) according to the control signals generated in the generating step, using the drive unit;
   wherein the determining step and the correcting step are performed with one of:
   each activation of the scanner (14) and
   at a predetermined interval of time after each activation.

2. Method according to claim 1, wherein in the determining step, at least one current value of a drive unit transfer function is determined by ascertaining an actual position of a drive (30) or a mechanical coupling element (30') of the drive unit (30, 30', 35) as a function of at least one of:
   the target movement and
   one of the change in the target movement and the control signals ascertained therefrom.

3. Method according to claim 1, wherein the determining step and the correcting step are repeated at predetermined intervals of time.

4. Method according to claim 1, wherein the determining step and the correcting step are repeated, and the frequency used in the determining and correcting steps is changed with each repetition.

5. Method according to claim 1, wherein the determining step and the correcting step are performed for several predetermined frequencies.

6. Method according to claim 1, wherein a deviation in the current value of the drive unit transfer function from a previously saved value of the drive unit transfer function, said value having been ascertained within a predetermined interval of time before or after ascertaining the value of the optical transfer function currently being used at the frequency is determined in the correcting step and the deviation is used for the correction.

7. Method according to claim 1, wherein the correction for at least one frequency is performed in the correcting step and a model for the transfer function to be corrected is determined for correction for other frequencies.

8. Optical scanner for carrying out the method according to claim 1, comprising:

a beam deflecting element (31) for deflection of a beam of optical radiation, a drive unit (30, 30', 35) for moving the beam deflecting element (31) according to control signals, according to the moving step of claim 1, and a scan control unit (35) connected to the drive unit (30, 30'), wherein the scan control unit carries out the determining, correcting, and generating steps of claim 19, and transmits the control signals to the drive unit (30, 30') for control of the drive unit (30, 30').

9. Optical scanner according to claim 8, wherein:

the drive unit (30, 30') has at least one of:
- a stepping motor for moving the beam deflecting element (31) and
- a position sensor (32) for acquiring the position of a motor or a mechanical coupling element of the drive unit (30, 30') and the scan control unit (35) uses the position of the stepping motor or a position signal of the position sensor (32) to ascertain the current value of the drive unit transfer function in the determining step.

10. Optical scanner according to claim 8, further comprising a timer device which triggers the scan control unit (35) repeatedly at predetermined time intervals so that it executes the determining step and the correcting step.

11. Optical scanner according to claim 8, wherein the scan control unit (35) performs the determining step and the correcting step with each activation of the scanner (14) or at a predetermined interval of time after each activation.

12. Optical scanner according to claim 8, wherein the scan control unit (35) repeatedly executes the determining step and the correcting step and changes the frequency used in the determining and correcting steps with each repetition.

13. Optical scanner according to claim 8, wherein the scan control unit (35) performs the determining step and the correcting step for several predetermined frequencies.

14. Optical scanner according to claim 8, wherein the scan control unit (35) determines a deviation in the current value of the drive unit transfer function from a corresponding, previously-saved value of the drive unit transfer function in performing the correcting step, wherein the scan control unit ascertains said previously-saved drive unit transfer function within a predetermined time interval before or after the determination of the value of the optical transfer function currently being used at the frequency, and wherein the scan control unit uses the deviation for the correction.

15. Optical scanner according to claim 8, wherein the scan control unit (35) performs the correction for at least one frequency in the correcting step and wherein the scan control unit determines a model for at least one of the frequency dependence of the parameters to be corrected and the transfer function to be corrected for other frequencies for the correction.

16. Laser scanning microscope having an optical scanner according to claim 8.

17. Optical scanner according to claim 8, wherein the transfer function is an optical transfer function.

18. Method according to claim 1, wherein the transfer function is an optical transfer function.

19. Method according to claim 1, wherein the target movement is a periodic target movement, wherein the predetermined frequency is the fundamental frequency of the target movement or one of the harmonic frequencies of the fundamental frequency, and wherein in the correcting step, the at least one parameter to be corrected includes the amplitude $s_k$ and the phases $\phi_k$ for the frequency components for frequencies k f, where k=1, . . . N, the scan frequency f is the fundamental frequency of the target movement, and the frequencies k f are the harmonic frequencies of the fundamental frequency for k>2.

* * * * *